United States Patent

Lininger

[15] 3,644,052
[45] Feb. 22, 1972

[54] SEA WAVE POWER GENERATOR

[72] Inventor: William W. Lininger, 775 S. Corona St., Denver, Colo.

[22] Filed: Feb. 16, 1970

[21] Appl. No.: 11,481

[52] U.S. Cl. .................................... 415/7, 60/22, 415/52
[51] Int. Cl. ............................................. F01d 25/28
[58] Field of Search ................. 415/2, 7, 151, 52, 55, 58; 60/22, 22.1, 22.2

[56] References Cited

UNITED STATES PATENTS

| 244,221 | 7/1881 | Fountain et al. | 415/7 |
| 1,003,635 | 9/1911 | Melander | 415/7 |
| 1,617,568 | 2/1927 | Bloss | 60/22 |
| 1,716,751 | 6/1929 | Avakian | 415/7 |
| 1,782,277 | 11/1930 | Smith | 415/7 |
| 1,793,743 | 2/1931 | McHenry | 415/7 |

*Primary Examiner*—C. J. Husar
*Attorney*—Richard D. Law

[57] ABSTRACT

A power generator, utilizing sea waves as a motivating mechanism, having a rotatable paddle wheel arranged to rotate a propeller shaft, includes a gathering platform to guide incoming wave propelled sea water in an overshot flow onto the paddle wheel and discharging the same into a catch basin which releases impounded sea water, on the wave recession, in an undershot paddle wheel flow to utilize both the incoming and outgoing sea waves as a source of power for the generator.

2 Claims, 7 Drawing Figures

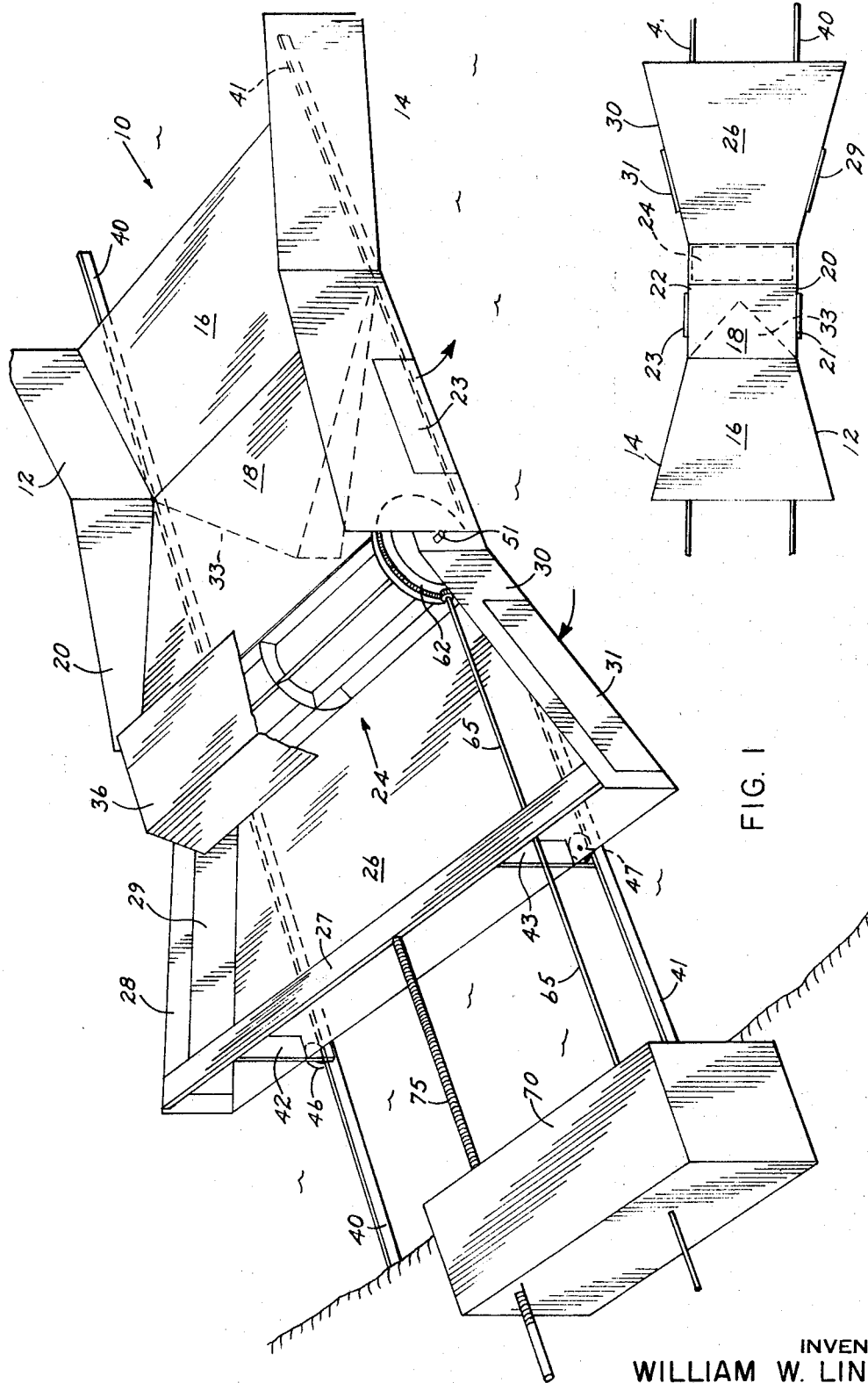

PATENTED FEB 22 1972 3,644,052

INVENTOR
WILLIAM W. LININGER
BY
Richard H. Law
ATTORNEY

SEA WAVE POWER GENERATOR

The ceaseless motion of the ocean moving onto and away from a shoreline, generally in waveform, represents a tremendous source of power. This power has in only a few rare instances been harnessed to produce usable power for mankind, usually power in the form of electricity. Where the power of the ocean has been harnessed, it provides cheap electric power without the expenditure of fossil fuels, which, as is well known, causes a majority of atmospheric pollution as well as much water pollution. A cheap source of electricity is, also, necessary for the imagined resurgency of electrically driven vehicles using storage battery as a receiver for generated electricity, and mass use of electrically driven vehicles requires a tremendous source of power for the regeneration energy of the vehicle batteries.

A number of attempts to utilize waves as a source of power have resulted in failure of power generation on a continuous basis. Rafts supporting rotatable paddle wheels have been proposed, but these have not been successful as they attempt to utilize direct, unimpeded wave power on the paddle wheels. Vertically moving floats attempting to harness the vertical changes in the surface of the ocean, due to moving waves, has, also, been attempted; however, these have not proved successful. One attempt to use the ocean as a source of power which has proved successful is the damming of a bay where extremely high tides pass through flood gates in the dam into the bay, which acts as a catch basin, and on the receding of the tide, the water in the catch basin is released through pen stocks turning turbines. Such a successful venture requires a particular geographical formation in the form of a large bay with a small neck and further requires very high tides. In one effective use of a system in Canada, the tides run in excess of 30 feet. Thus, this successful system is extremely limited in application since few places in the world have such consistently large tides and few such necessary bays are found.

According to the present invention there is provided a sea wave power generator which utilizes a wave-propelled water flow gathering platform for directing wave-propelled sea water over a paddle wheel into a catch basin, and water, released from the catch basin as the wave recedes, flows under the same paddle wheel. The paddle wheel is rotated in the same direction by both the incoming wave and the receding wave for continuously rotating a propeller shaft unidirectionally, which in turn may rotate an electrical generator. The total mechanism is mounted for reciprocal movement on a shore so that it may be positioned in response to water level, as tides ebb and flow. Means for changing the position of the mechanism may be made automatic following precisely the ebb and flow of the tides. The device is arranged with a catch basin which not only accepts water from the overshot flow across the paddle wheel, but, also, through one-way flood gates on the side of the catch basin permitting a large volume of water to be accumulated for rotating the paddle wheel on receding waves.

Included among the objects and advantages of the present invention is a sea wave power generator for producing inexpensive power.

Another object of the invention is to provide a sea wave power generator utilizing a wave-gathering platform for producing an overshot water flow on a paddle wheel by an incoming wave and a catch basin for releasing sea water on wave recession to produce an undershot wheel motion of the same wheel.

A still further object of the invention is to provide a sea wave power generator utilizing a rotating paddle wheel which is arranged to be reciprocated up and down a shoreline corresponding to the level of the water.

A still further object of the invention is to provide a sea wave power generator providing a wave-gathering platform to direct incoming waves in an overshot action over a paddle wheel into an enlarged catch basin which is, also, arranged to receive sea water bypassing said platform to provide a large accumulation of water from wave action to rotate the paddle wheel on wave recession from the shore.

An additional object of the invention is to provide an inexpensive sea wave power generator which may be provided on a shoreline for utilizing the power of sea waves ebbing and flowing from the shore.

These and other objects and advantages of the invention may be readily ascertained by referring to the following description and appended illustrations in which:

FIG. 1 is a generally pictorial view, partly broken away, of a device according to the invention;

FIG. 2 is a reduced scale top plan view of the device of FIG. 1;

Figure 3:
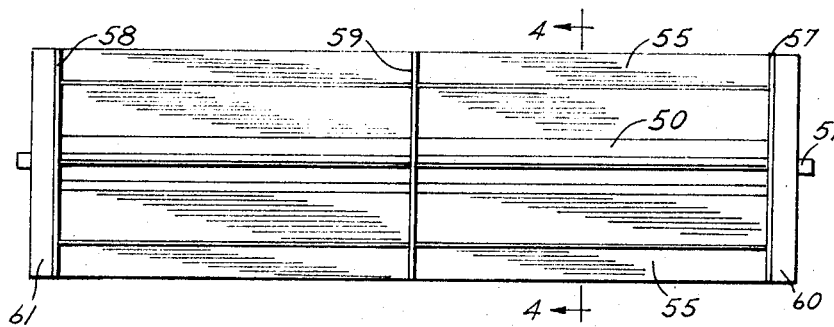
FIG. 3 is a front elevational view of one form of paddle wheel useful for a sea power generator according to the invention.

In the device illustrated in the drawings, an incoming wave catch ramp, shown in general by numeral 10, includes gathering wings 12 and 14 mounted on a platform 16 converging to a ramp 18, having guide wings 20 and 22. The wings or sides and the ramp may be made of any material sufficiently strong to support the weight of water and pounding of waves flowing up the ramp. Boards, sheet metal, and the like, mounted on supporting beams may be used. The wings 12 and 14 gather the wave propelled water from the mouth of platform converging it onto the ramp 18. This produces an increased quantity of water from each wave in relation to the width of the ramp. Water from the ramp 18 is discharged over a paddle wheel 24 in an overshot flow, and a cover 36 covers the wheel, where desired. Water from the overshot flow on the paddle wheel flows into a catch basin, shown in general by numeral 26, which includes a platform 26 with converging wings 28 and 30. Mounted in the wing 28 is an in-swinging flood gate 29 which permits wave-propelled sea water bypassing the ramp and coming up on the shore to flow into the catch basin 25. In a similar manner, an in-swinging flood gate 31 in the wind 30, also, permits water to flow into the catch basin 25. Water, after being driven up on the shore by the waves, recedes from the shore, and the water on the gathering platform 10 also recedes. Water in the catch basin tends to recede with wave but it passes in an undershot flow under the paddle wheel 24 to a chamber under the ramp 18 where it is divided by a triangular shaped barrier 33. The divided water then exhausts through out-swinging flood gates in each of the sidewalls of the ramp. Flood gate 23 releases water impinging on the wall 22, and in a like manner, flood gate 21 releases water impinging on the wall 20 from the deflecter 33.

The ramps and platforms are suitably supported on structure which is sufficiently strong to support the weight of the water necessary for operating the device and to withstand the pounding from the waves coming into shore. The supporting structure may be made of wood, steel or conventional materials necessary to withstand the corrosion from the sea water and with sufficient strength to support the mechanisms.

Preferably, the unit is mounted on tracks, and for the purpose tracks 40 and 41 are provided. A sufficient number of wheels and supporting structure are provided on the unit so that it may be reciprocated up and down a beach toward and away from the water. As an example, braces 42 and 43, supported against an overhead brace 27, support wheels 46 and 47 at the rear end of the catch basin 25. The number of wheels necessary for free reciprocal motion of the unit depends upon the size and the weight of the device, and providing such is conventional for the movement of large equipment such as the present device.

Figure 4:
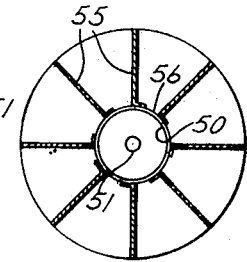
FIG. 4 is a cross-sectional view of the paddle wheel of FIG. 3 taken along section line 4—4.

Preferably, the paddle wheel is light but sufficiently strong to retain its structural integrity under the action of the sea. In one form, the wheel is formed of elongated paddles mounted on a central tube. As illustrated in FIGS. 3 and 4, a central tube 50 is suitably provided with a shaft 51 for mounting in bearings in the wall of the unit. Such mounting and bearing arrangements are conventional. Secured to the exterior of the tube 50 in longitudinal array are a plurality of paddles 55, which are provided with an angled end 56 welded, riveted, bolted, or otherwise secured to the exterior of the tube 50 supporting these paddles radially outwardly from the tube. Annular end braces 57 and 58 may be provided for the unit and an annular center brace 59 provides additional strength for the paddle wheel. Weighted elements 60 and 61 may be provided on the paddle to act as flywheels for smooth, uniform rotation of the paddle wheel. In one size a 12-inch diameter tube supporting 12-inch blades provides a satisfactory paddle wheel.

Figure 6:
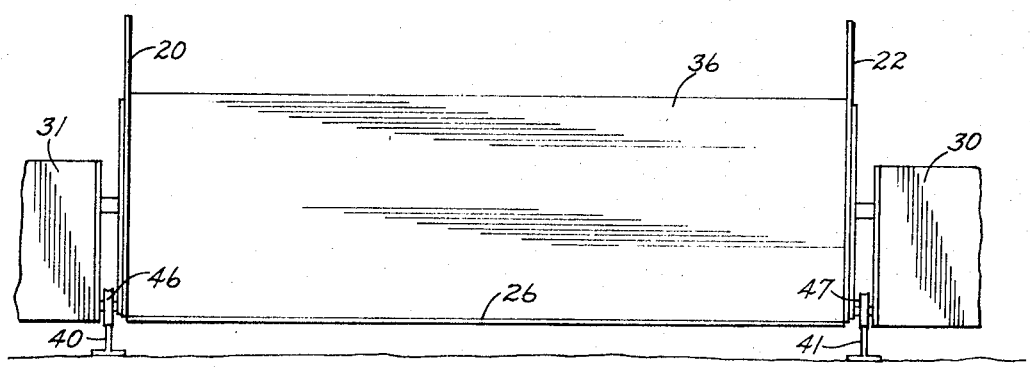
FIG. 6 is a partial end elevational view of the sea wave power generator according to the invention.
Figure 7:
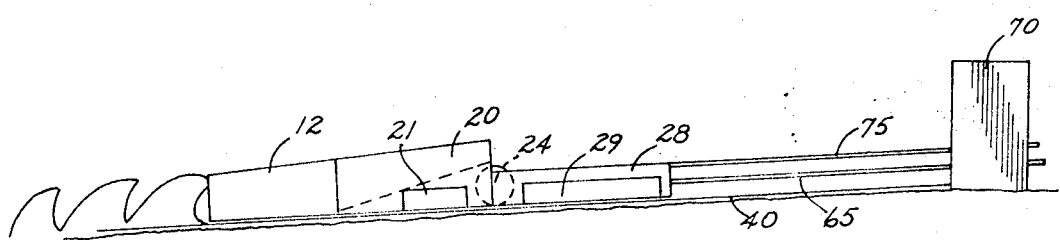
FIG. 7 is a side elevational view, in reduced scale, of the generator according to the invention illustrating positioning of the generator on a seashore.

In one form, the rails 40 and 41 are illustrated as inverted T-shaped rails, FIG. 6, however, these may be any conventional type of rail which will support the weight of such a unit, so long as these are arranged to mate with and reciprocally support the wheels of the unit.

Figure 5:
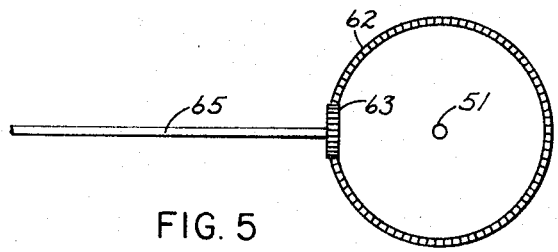
FIG. 5 is a generally schematic view of one form of power takeoff of the paddle wheel of the sea wave generator according to the invention.

Power may be taken from the paddle wheel by any conventional power takeoff means, and one form is illustrated in FIG. 5, wherein a beveled ring gear 62 on the end of the paddle wheel is meshed with a driven bevel gear 63. The driven gear drives a propeller shaft 65. Obviously, other types of power takeoffs and drives, which may include belt drives or the like, may be utilized in connection with the paddle wheel. Also, it may be desirable to utilize two power takeoffs for the paddle wheel, one from each end. The propeller shaft 65 extends into a powerhouse 70, where the propeller shaft is utilized to rotate an electrical generator (not shown). The power or motion transfer mechanism between the propeller shaft 65 and the generator may be any conventional transfer mechanism such as a gear drive, including a bevel gear. Furthermore, since the unit reciprocates toward and away from the powerhouse 70 a slip motion must be provided between the propeller shaft 65 and the power transfer mechanism. This may simply be a square shaft in a square hub of a drive gear which permits the propeller shaft to slide through the square opening of the hub as the unit is moved toward and away from the shore. Obviously, a telescoping propeller shaft may be used as well as other types of power transfer means.

To move the unit up and down the beach, a push-pull rod 75 is attached to the overhead brace 27 and passes into the powerhouse 70. In one form, the push-pull rod 75 may be a jack screw with the rotating means being essentially conventional and mounted in the house for moving the unit toward and away from the powerhouse 70. The push-pull rod may, also, be a rack with a pinion drive, a pinion drive being mounted in the house, and the rack extendable through the powerhouse, such push-pull motion being formed of conventional mechanical elements.

The unit may be made as wide as desired, depending upon the shore conditions and the power requirements. Furthermore, one paddle wheel is shown in a unit, however, two or more may be mounted in series in the unit to provide multiple-power takeoffs for the produced power. Furthermore, the diameter of the paddle wheel is determined by the size of the unit and the gathering capacity of the wave-receiving platform and its ability to force a sufficient amount of water over the paddle wheel.

In general, the unit is placed in the ocean at about normal water level (disregarding the waves). As a wave comes into the shore a portion of the water is gathered in by wings 12 and 14, which causes the water to converge onto the short ramp 18, where the wave-propelled water flows in an overshot flow over the paddle wheel 24. The water flows from the paddle wheel into the catch basin 25. Wave-propelled water coming around the outside of the wings 12 and 14 flows up the shore and as it impinges upon the wings of the catch basin, the water flows through the flood gates into the catch basin providing an additional quantity of water in the catch basin. After the wave is spent and as the water recedes from the shore, the water in the catch basin likewise tends to recede. The catch basin water flows under the paddle wheel in an undershot flow into the chamber underneath the platform 18, where it is divided flowing out the flood gates 21 and 23. The gates are out-swinging flood gates to prevent the inflow of water, but release water flowing out of the catch basin. The unit is reciprocated up and down the shoreline on the tracks by means of a push-pull rod 75, which may be a rope and pulley arrangement where the shore is steep enough to permit the weight of the unit to move it out away from the powerhouse. Also, a hydraulic, telescoping cylinder may be used to move the unit up and down the beach. The movement of the unit may be timed according to the tides, and the mechanism for adjusting the position of the unit may be a timing device set with the tides. Also, the control may be an independent float-controlled, water level finder which actuates the motor moving the unit toward and away from the powerhouse in response to water level. The timing mechanism may be a conventional timing mechanism, set to move the unit in relation to the ebb and flow of the tides, so as to position the unit at the correct level in the ocean for producing the necessary power for rotating the paddle wheel 24.

Incoming waves do not always approach the shore in a parallel array, and thus the rails should be anchored to prevent side movement if the waves impinge on the unit at an angle. Further, it may be desirable to use a locking frame for the wheels on the frame to prevent the unit from being removed from the rails by wave action.

I claim:

1. A sea wave power generator comprising wave-gathering means including upright side means and an inclined ramp secured thereto, said gathering means converging from a wide mouth to a narrow neck with a sided ramp extending from said inclined ramp to an elevated point; paddle wheel means mounted adjacent said elevated point in position to receive water from said sided ramp in an overshot flow; catch basin means including a ramp and upwardly depending sides to hold water in said catch basin means, said catch basin means being positioned adjacent said paddle wheel means to accept water from said paddle wheel means, and said depending sides being divergent from said paddle wheel means; a plurality of in-swinging flood gates mounted on said depending sides permitting entry of water but preventing the exit of water from said catch basin means; said paddle wheel means being arranged to receive an undershot flow of water from said catch basin; a pair of sides extending downwardly from said sided ramp forming an enclosure under said inclined ramp adjacent said paddle wheel means; a plurality of out-swinging flood gate means in said pair of sides to exhaust water from said undershot flow into said enclosure and prevent entry of water from said sides; and power takeoff means for transmitting the rotary motion of said paddle wheel means.

2. A sea wave power generator according to claim 1 being further characterized by said unit being mounted on wheels and track means extending from a beach on which the unit is mounted to the water so as to permit movement of said unit toward and away from the beach; and timing means for timing said unit in relation to the ebb and flow of tides.

* * * * *